United States Patent
Steiner et al.

(10) Patent No.: US 12,253,348 B2
(45) Date of Patent: Mar. 18, 2025

(54) METHOD AND SYSTEM FOR PROVIDING INDIVIDUAL INFORMATION ABOUT A COORDINATE MEASURING DEVICE

(71) Applicant: LEICA GEOSYSTEMS AG, Heerbrugg (CH)

(72) Inventors: Markus Steiner, Granichen (CH); Philip Kim, Galloway, OH (US)

(73) Assignee: LEICA GEOSYSTEMS AG, Heerbrugg (CH)

( * ) Notice: Subject to any disclaimer, the term of this patent is extended or adjusted under 35 U.S.C. 154(b) by 395 days.

(21) Appl. No.: 17/855,595

(22) Filed: Jun. 30, 2022

(65) Prior Publication Data
US 2024/0003673 A1    Jan. 4, 2024

(51) Int. Cl.
G06F 21/45   (2013.01)
G01B 11/00   (2006.01)
H04W 76/10   (2018.01)

(52) U.S. Cl.
CPC ........... *G01B 11/005* (2013.01); *H04W 76/10* (2018.02); *G01B 2210/58* (2013.01)

(58) Field of Classification Search
CPC .. G01B 11/005; G01B 2210/58; H04W 76/10
See application file for complete search history.

(56) References Cited

U.S. PATENT DOCUMENTS

| | | |
|---|---|---|
| 2002/0032541 A1 | 3/2002 | Raab et al. |
| 2015/0330762 A1 | 11/2015 | Gong |
| 2018/0143016 A1* | 5/2018 | Riek ............... H04W 12/06 |
| 2020/0080839 A1 | 3/2020 | Antreasyan et al. |

FOREIGN PATENT DOCUMENTS

| | | |
|---|---|---|
| DE | 102020212982 A1 * | 12/2020 |
| WO | 2015/175460 A1 | 11/2015 |

OTHER PUBLICATIONS

European Search Report issued in corresponding application No. 23181493.0, dated Nov. 10, 2023.

* cited by examiner

*Primary Examiner* — Mohamed Charioui
*Assistant Examiner* — Christine Y Liao
(74) *Attorney, Agent, or Firm* — Maschoff Brennan

(57) ABSTRACT

Computer system and computer-implemented method comprising: providing a digital-twin database comprising individual digital twins for a multitude of coordinate measuring devices; assigning an individual code to each of the multitude of coordinate measuring devices; providing on a first coordinate measuring device the assigned code; and pairing the first device with a mobile device, the pairing comprising capturing the individual code of the first device and sending the captured individual code together with an identifier, verifying the sent individual code and storing the identifier of the mobile device assigned to the digital twin of the first device.

20 Claims, 4 Drawing Sheets

METHOD AND SYSTEM FOR PROVIDING INDIVIDUAL INFORMATION ABOUT A COORDINATE MEASURING DEVICE

The present disclosure pertains to a computer system and to a computer-implemented method for providing to a user of a coordinate measuring device information about the individual coordinate measuring device on a mobile device.

Coordinate measuring devices, such as stationary coordinate measuring machines (CMM) or portable articulated arm coordinate measuring machines (AACMM) or laser-based coordinate measuring devices including laser trackers, laser scanners and total stations are used in a wide variety of applications in quality management and quality assurance. A user of such a coordinate measuring device may want to know individual details about the device, e.g. to simply determine the due date for the next inspection or calibration or to assess its overall precision bases on the built-in parts. Some devices comprise displays for providing some information to the user. Other devices comprise interfaces for connecting external devices by means of which some information about the devices may be provided to the user. However, these interfaces often comprise non-standard connectors or need special devices or software for a successful connection, so that establishing a connection may be cumbersome and/or require special equipment.

WO 2015/175460 A1 discloses a method for initiating communication between a coordinate measuring device that is embodied as 3D metrology instrument and a mobile device using near-field communication (NFC).

However, the coordinate measuring device would need a data storage for storing the information and means for establishing a wireless data connection for exchanging data in order to provide the required information. Also, the information stored in the device itself needs to be complete and kept up-to-date.

It therefore an object to provide an improved method and system that allow a user or owner of a coordinate measuring device to easily access information about the individual coordinate measuring device.

It is a further object to provide such a method and system that allow accessing information about the individual coordinate measuring device that is complete and up-to-date.

It is a further object to provide such a method and system that allow accessing information about the individual coordinate measuring device without having to turn the device on and without having to interrupt an ongoing measuring operation of the device.

It is a further object to provide such a method and system that allow accessing individual device information of coordinate measuring devices that have a simple setup, particularly not comprising data storages or interfaces for providing device information.

At least one of these objects is achieved by the computer-implemented method according to claim 1, the system according to claim 11 and/or the dependent claims.

A first aspect relates to a computer-implemented method for providing information about an individual coordinate measuring device to an owner or a user of the coordinate measuring device, the method comprising providing, in a computational environment, a digital-twin database comprising individual digital twins for a multitude of coordinate measuring devices, each individual digital twin comprising information about the respective individual coordinate measuring device;
assigning an individual code to each of the multitude of coordinate measuring devices;
providing the individual code of a first coordinate measuring device on the first coordinate measuring device; and
pairing the first coordinate measuring device with a mobile device of the owner or user of the first coordinate measuring device, particularly wherein the the mobile device is a smartphone or a tablet computer.

The pairing comprises capturing, by the mobile device, the individual code of the first coordinate measuring device;
establishing a remote data connection between the mobile device and the computational environment;
sending the captured individual code together with an identifier of the mobile device or of a user of the mobile device from the mobile device to the computational environment via the established data connection; and
verifying, at the computational environment, the sent individual code and, in case of a positive result of the verification, storing the identifier of the mobile device assigned to the digital twin of the first coordinate measuring device.

According to this aspect, the method further comprises sending a request from the mobile device to the computational environment for information about the first coordinate measuring device together with the identifier of the mobile device;
determining a validity of the request based on the identifier;
retrieving the requested information from the individual digital twin of the first coordinate measuring device and sending the requested information to the mobile device; and
providing the information about the first coordinate measuring device on a display of the mobile device to the user of the mobile device.

According to some embodiments of the method, the computational environment comprises one or more server computers or a cloud-computing environment of a manufacturer of the first coordinate measuring device, and the pairing comprises sending owner related to the owner of the first coordinate measuring device or user information related to the user of the first coordinate measuring device from the mobile device to the computational environment; and
storing the owner or user information in the digital-twin database, assigned to the individual digital twin of the first coordinate measuring device.

According to some embodiments of the method, the information about the individual coordinate measuring devices in the digital-twin database comprises information about individual components of the respective individual coordinate measuring device, and the provided information about the first coordinate measuring device comprises information about individual components of the first coordinate measuring device, wherein the information about the individual components at least comprises—for each individual component—a lot number, a manufacturer and/or a manufacturing date.

According to some embodiments, the method further comprises providing an application software program and installing the application software program on the mobile device.

Said application software program has program code for capturing the individual code of the first coordinate measuring device;
establishing the data connection between the mobile device and the digital-twin database;

sending the captured individual code to the digital-twin database; and presenting the information about the first coordinate measuring device on a graphical user interface.

According to some embodiments of the method, the individual code is provided as a visible code on a surface of the first coordinate measuring device, for instance in the form of a QR code, and the individual code is captured by a camera or other optical sensor of the mobile device.

According to some embodiments of the method, the individual code is provided as an NFC (near-field communication) tag, and the individual code is captured by means of near-field communication using an NFC module of the mobile device.

According to some embodiments of the method, sending the request comprises capturing, by the mobile device, the individual code of the first coordinate measuring device, and sending the captured individual code together with the request.

According to some embodiments of the method, the data connection between the first coordinate measuring device and the database is established using a cellular phone network and a subscriber identity module of the mobile device, for instance using a SIM card or an embedded SIM.

According to some embodiments of the method, information about the individual coordinate measuring device of each individual digital twin is continuously updated, and retrieving the requested information from the individual digital twin of the first coordinate measuring device comprises retrieving the most recently updated information of the first coordinate measuring device.

According to some embodiments of the method, the first coordinate measuring device is a laser-based metrology device, for instance a laser tracker, a laser scanner or a total station. According to other embodiments of the method, the first coordinate measuring device is a coordinate measuring machine (CMM), such as a portable articulated arm CMM (AACCM) or a stationary CMM. According to other embodiments of the method, the first coordinate measuring device is a structured-light scanner or a photogrammetric system.

A second aspect relates to a computer system for providing information about an individual coordinate measuring device to an owner or user of the individual coordinate measuring device, the system comprising one or more server computers, wherein the one or more server computers comprise memory for storing a digital-twin database, the digital-twin database comprising individual digital twins for a multitude of coordinate measuring devices, each individual digital twin comprising information about the respective individual coordinate measuring device, wherein the computer system is configured to receive from the mobile device via a remote data connection an individual code of a first coordinate measuring device together with an identifier of the mobile device or of a user of the mobile device;

to verify the sent individual code and, in case of a positive result of the verification, to store the identifier of the mobile device in the digital-twin database assigned to the digital twin of the first coordinate measuring device;

to receive from the mobile device via the remote data connection a request for information about the first coordinate measuring device together with the identifier of the mobile device;

to determine a validity of the request based on the identifier; and to provide the requested information from the individual digital twin of the first coordinate measuring device to the mobile device via the remote data connection.

According to some embodiments of the computer system, an application software program ("app") is stored in the memory, and the memory is configured to provide the app via the remote data connection to the mobile device, wherein the app comprises program code that, when executed on the mobile device, provides at least a pairing functionality and a request functionality. The pairing functionality comprises capturing, by the mobile device, the individual code of the first coordinate measuring device and sending the captured individual code together with the identifier via the remote data connection. The request functionality comprises sending the request for information together with the identifier of the mobile device via the remote data connection, receiving the requested information via the remote data connection, and providing the information about the first coordinate measuring device in a graphical user interface (GUI) on a display of the mobile device.

In one embodiment, the mobile device is a smartphone or a tablet computer, the app being installable in a memory of the mobile device, the individual code is provided as a visible code on a surface of the first coordinate measuring device, e.g. in the form of a QR code, and the pairing functionality comprises capturing the individual code by a camera or other optical sensor of the mobile device.

According to some embodiments, the computer system is configured to receive from the mobile device via the remote data connection owner or user information (related to the owner or user of the first coordinate measuring device), e.g. together with the individual code of the first coordinate measuring device and the identifier; and to store the owner or user information in the digital-twin database, assigned to the individual digital twin of the first coordinate measuring device.

A third aspect pertains to a computer program product comprising program code which is stored on a machine-readable medium, or being embodied by an electromagnetic wave comprising a program code segment, and having computer-executable instructions for performing, in particular when run on a computer system according to the first aspect, the method according to the second aspect.

Aspects will be described in detail by referring to exemplary embodiments that are accompanied by figures, in which.

Figure 1:
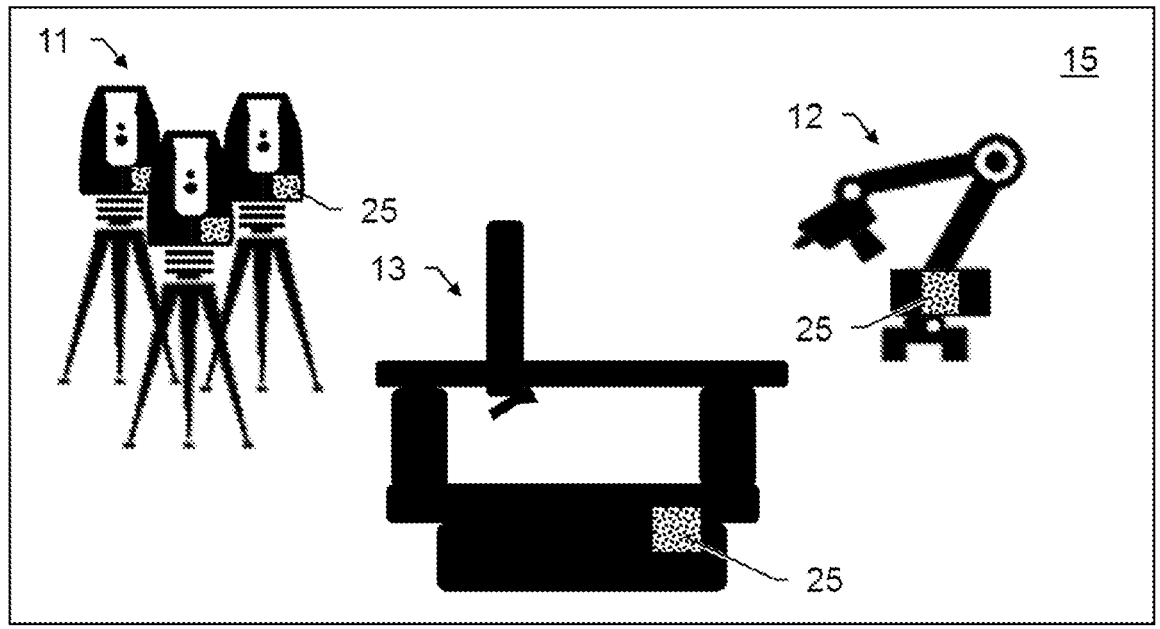
FIG. 1 shows a location with an exemplary set of coordinate measuring devices.

FIG. 1 shows an exemplary set of different coordinate measuring devices 11, 12, 13 that are present at a location 15. For instance, the location 15 may be at a production facility or similar site where the devices are used e.g. for monitoring production processes or measuring produced workpieces for quality assurance. Alternatively, the location 15 may be a storage of a rental shop where the devices 11, 12, 13 are leased to end customers. The shown set of coordinate measuring devices comprises three laser trackers 11, one portable articulated arm CMM 12 and one stationary CMM 13. The set however may comprise also other kinds of coordinate measuring devices, e.g. reality capture devices, laser scanners or total stations as well as unmanned aerial or ground vehicles (UAV/UGV) comprising coordinate measuring equipment.

A distinct and individual code is assigned to each of the devices 11, 12, 13 and provided at the device so that the code is readable by an external mobile device (not shown here) and the device 11, 12, 13 is unambiguously identifiable based on the assigned code. For instance, as shown here, the code may be provided as a visible code element 25 on a surface of the device, e.g. on a cover, so that it can be captured using a camera or other visual sensor of the mobile device. The visible code element 25 for instance can be a barcode or a QR code. Alternatively or additionally the code can be provided as alphanumeric data, so that it is readable by a human user.

The code may also be provided in a non-visible manner, e.g. by means of near-field communication (NFC), wherein each device comprises an NFC tag readable by an NFC reader of the mobile device. The position of the NFC tag may be marked to facilitate capturing the code using the mobile device.

Figure 2:
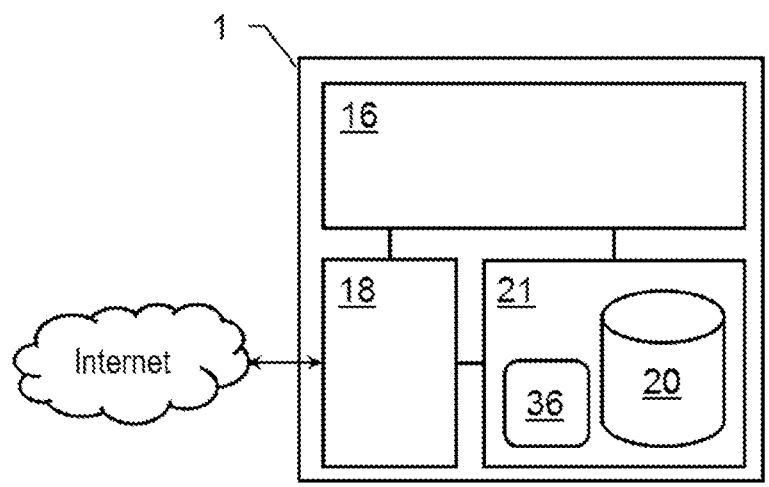
FIG. 2 shows a server computer as part of an exemplary embodiment of a computer system.

FIG. 2 shows an exemplary server computer 1 as a part of a computational environment, e.g. as a part of an exemplary embodiment of a computer system. The depicted server computer 1 comprises a processor 16, a communication unit 18 and a memory 21 that are operatively coupled with each other.

The memory 21 has stored a digital-twin database 20. The digital-twin database 20 comprises individual digital twins for a multitude of individual coordinate measuring devices. Each individual digital twin comprises individual information about the respective individual coordinate measuring device. The memory 21 may also have stored an application software program ("app") 36 that can be downloaded, installed and executed on a mobile device.

The communication unit 18 is configured to establish remote data connections via the Internet, e.g. with a mobile device the app 36 is installed on.

According to the illustrative embodiment shown here, the server computer 1—either on its own or in combination with other server computers of a computer system—is configured:
 to receive, by means of the communication unit 18 and via a remote data connection, an individual code of a coordinate measuring device together with an identifier of a mobile device sending the code and/or of a user of that mobile device;
 to verify the sent individual code based on data stored in the database 20;
 to store the identifier in the database 20 assigned to the digital twin of that coordinate measuring device to which the individual code has been assigned;
 to receive, by means of the communication unit 18 and via a remote data connection, a request for information about a coordinate measuring device together with an identifier of the mobile device sending the request;
 to determine a validity of the request based on the identifier sent together with the request and the identifier stored in the database 20; and
 to provide, by means of the communication unit 18 and via a remote data connection, the requested information stored in the individual digital twin of the respective coordinate measuring device.

Figure 3:
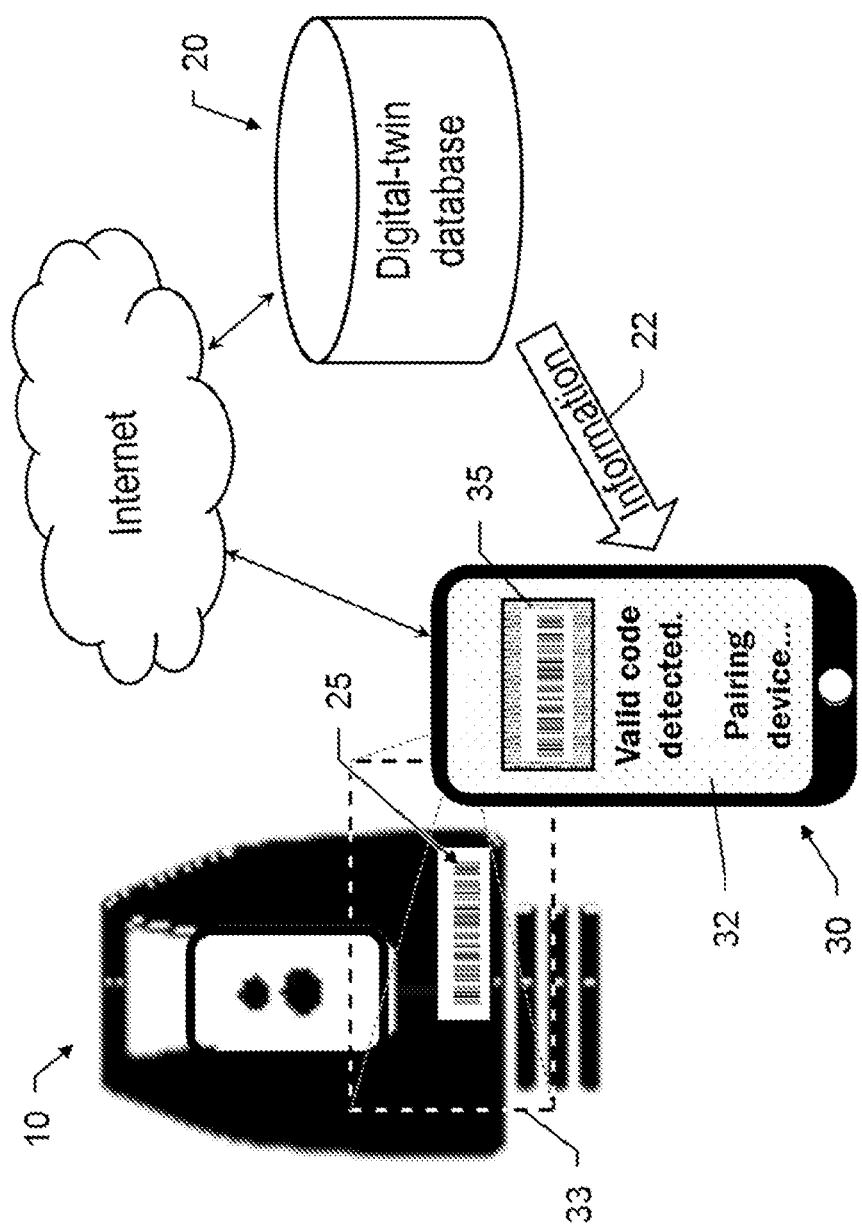
FIG. 3 illustrates retrieving actual information about an exemplary coordinate measuring device using a mobile device.

FIG. 3 shows an exemplary coordinate measuring device 10, information about which being retrieved from the digital-twin database 20 using a mobile device 30 according to an exemplary embodiment of a method.

The owner of the set of coordinate measuring devices 11, 12, 13 of the set shown in FIG. 1 or a user of one of the devices may want to know individual details about a certain device. In the shown example, a user wants to receive information regarding a first coordinate measuring device 10, i.e. the depicted laser tracker. Although some devices comprise interfaces by means of which some information about the devices may be provided to the user, the information stored in the device itself may not be complete or outdated. Also, some devices do not have any interface, or non-standard connectors or need special devices or software for a successful connection. Thus, the information is stored in a digital-twin database 20 that is accessible via a remote data connection via the Internet. The digital-twin database 20 is stored in a computational environment, e.g. on a server computer as shown in FIG. 2 or by means of cloud computing.

In some embodiments, the user requires a smartphone, tablet computer or similar mobile device 30 having installed an application software program ("app") that allows retrieving the information 22 from the digital-twin database 20. Installing the app may require a registration process to register the mobile device 30 and/or its user within the system. An identifier is assigned to the mobile device 30 and/or its user.

The app 36 may be installable in a memory of the mobile device. The app 36 comprises program code that, when the app is executed on the mobile device, provides a number of functionalities for retrieving information from the digital-twin database 20, e.g. for performing certain steps of a method. These functionalities may comprise at least a pairing functionality and a request functionality. The pairing functionality comprises capturing, by the mobile device, the individual code of the first coordinate measuring device and sending the captured individual code together with an identifier of the mobile device or its user via the remote data connection to the server computer. The capturing of the individual code may comprise using an optical sensor, such as a camera of the mobile device. The request functionality comprises sending a request for information together with the identifier via the remote data connection to the server computer 1, receiving the requested information via the remote data connection, and providing the information about the first coordinate measuring device in a GUI on a display of the mobile device.

For accessing the information 22, the user starts a pairing functionality of the app, upon which a camera of the mobile device captures images 33 to detect the visual code element 25—here embodied as a barcode. A representation 35 of the presently captured image 33 may be displayed in real time on a display 32 of the mobile device 30 to assist the user in capturing the image 33 of the code element 25. Together with the assigned identifier, the code is sent via the remote data connection to the computational environment. There, the code is verified, and in case of a positive result of the verification, the identifier of the mobile device 30 is assigned to the digital twin of the coordinate measuring device 10. This pairing of the mobile device 30 with the coordinate measuring device 10 henceforth allows the user of the mobile device 30 to access the information 22 of the individual device stored in the database 20.

Figure 4:
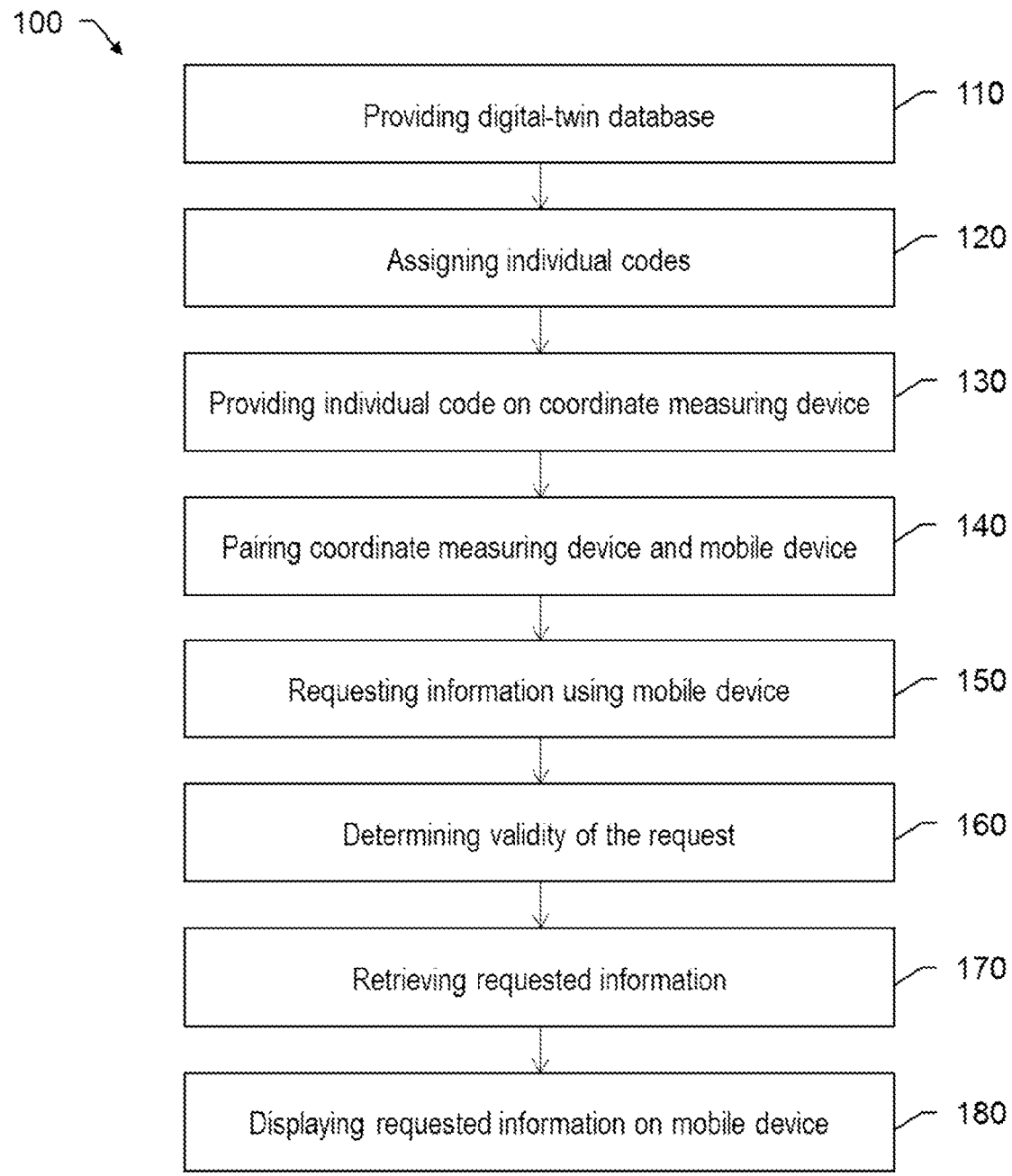
FIG. 4 shows a flow chart illustrating an exemplary embodiment of a method.

FIG. 4 shows a flow chart illustrating an exemplary embodiment of a computer-implemented method 100.

The method starts with providing 110 a digital-twin database in a computational environment, e.g. on a server computer as shown in FIG. 2. The computational environment may comprise one or more server computers or a cloud-computing environment. For instance, the computational environment and/or the digital-twin database can be provided by a manufacturer of the coordinate measuring devices.

The database comprises an individual digital twin for each individual coordinate measuring device of a multitude of devices. Each individual digital twin comprises information about the respective individual coordinate measuring device, for instance about individual components of the respective individual coordinate measuring device, such as information about a lot number, a manufacturer and/or a manufacturing date of each individual component. Additionally, the stored data of each individual twin may comprise additional information such as information about a registered owner or user, past usage, a predicted demand for maintenance, and activated or activatable features of the device.

In a next step, each of the coordinate measuring devices, a digital twin of which being stored in the digital-twin database, is assigned 120 a distinct individual code, by which each individual coordinate measuring device can be identified unambiguously. For instance, the individual code may be or comprise a serial number or similar existing identifier of the device. It may be a code that is assigned solely for the purpose of linking the real-world device to its digital twin.

The assigned individual code is then provided 130 on the coordinate measuring device, preferably in such a way that it is easily capturable using a mobile device. The individual code may be provided as a visible code element on a surface of a cover of the coordinate measuring device, e.g. in the form of a QR code or a barcode, so that it can be captured easily by a camera or other optical sensor (e.g. a barcode scanner). Alternatively or additionally, the individual code may be provided 130 on the device in a non-visible manner, e.g. by means of near-field communication (NFC), wherein each device comprises an NFC tag readable by an NFC reader. The position of the NFC tag may be marked to facilitate capturing the code using the mobile device. Alternatively or additionally, the individual code may be provided 130 as plain text so that it can be read by a human user as well as be automatically detected in a camera image using text recognition.

The next step is a pairing functionality 140, wherein a mobile device is paired with a certain coordinate measuring device—or more precisely with the digital twin of that coordinate measuring device—by sending the respective individual code to the computational environment in which the digital-twin database is provided. This pairing functionality 140 is described in further detail in FIG. 5.

After a successful pairing of the mobile device with the coordinate measuring device, a user of the mobile device may request 150 information about the coordinate measuring device. For instance, the user may select the device from a list of paired devices displayed in a graphical user interface (GUI) on a display of the mobile device. Alternatively, the user may use the mobile device to capture the code of the device of interest. This request is sent to the digital-twin database together with an identifier of the mobile device or a personal identifier of the user. Optionally, pairing 140 and requesting 150 for the user can be performed as one operation.

The validity of said request is determined 160 at the computing environment. This may comprise confirming that the requesting user has the right to receive the information, e.g. is a registered user. For instance, if an identifier of the mobile device or a personal identifier of the user has been stored together with the respective digital twin as a part of the pairing functionality 140, the validity check comprises at least comparing the sent identifier and the stored identifier.

If the request is valid, the requested information is sent and retrieved 170 by the mobile device. This may comprise storing the information in a non-volatile memory of the mobile device. The information is then displayed 180 to the user, e.g. presented in a GUI on a display of the mobile device. Preferably, the information is displayed 180 in real time, i.e. without substantial delay (based on the speed of the data connection available at the position of the mobile device; e.g. less than ten seconds) after the user has requested 150 the information.

Figure 5:
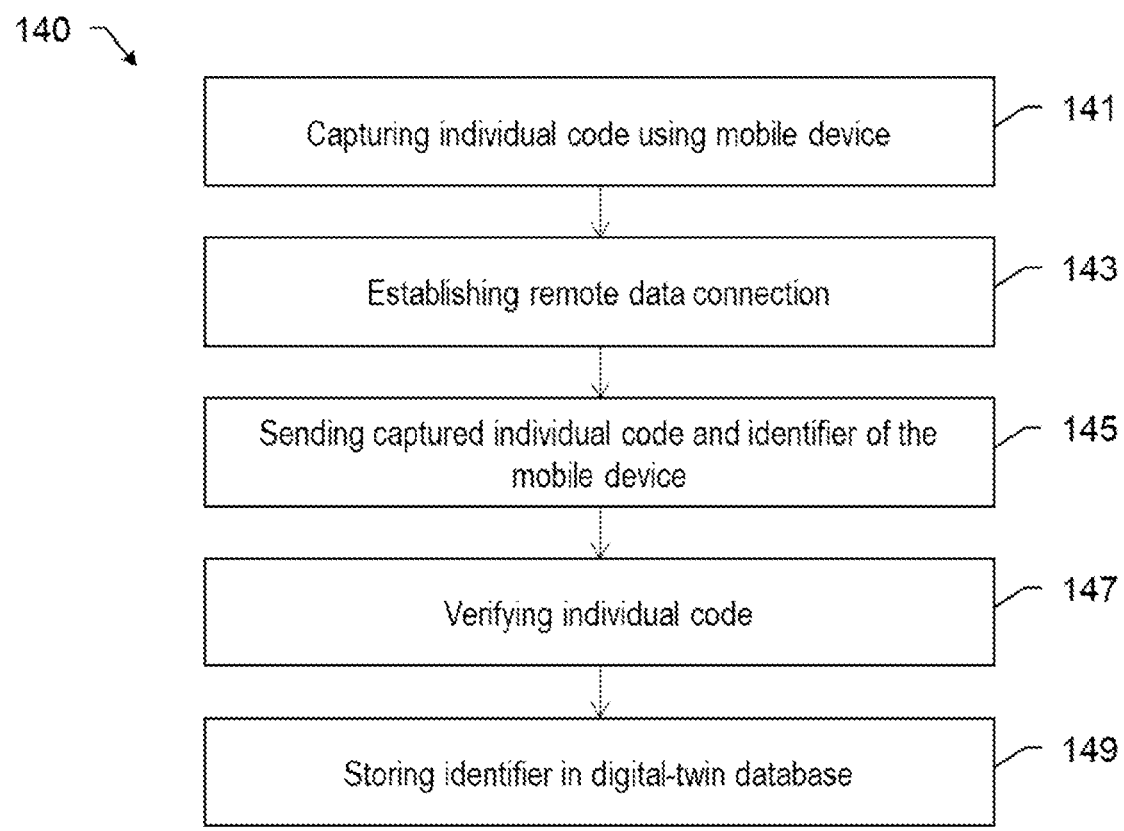
FIG. 5 shows a flow chart illustrating the process of pairing a coordinate measuring device and a mobile device as a part of an exemplary embodiment of a method.

FIG. 5 shows a flow chart illustrating steps of a pairing functionality 140 of an exemplary embodiment of a computer-implemented method 100.

The pairing starts with capturing 141 the individual code of the coordinate measuring device using the mobile device. If the individual code is provided as a visible code on a surface of the coordinate measuring device, e.g. as a QR code or a barcode, the user aims a camera or another optical sensor camera—e.g. a barcode reader—of the mobile device to the visible code so that the individual code is captured 141 by the camera or other optical sensor. If the individual code is provided as a NFC tag, the user moves an NFC module of the mobile device close to the NFC tag so that the individual code is captured 141 by means of near-field communication.

Next, a remote data connection with computational environment in which the digital-twin database is provided, is established 143, e.g. with the server computer of FIG. 2. The individual code of the device of interest and an identifier of the mobile device, the app or the user is sent 145 via the established remote data connection.

The sent individual code is verified 147 at the database, i.e. it is at least verified that a digital twin having the same code assigned is present in the digital-twin database. After a successful verification, the sent identifier is stored 149 in the digital-twin database assigned to the digital twin having the same code assigned as the coordinate measuring device.

A confirmation may be shown in a GUI of the mobile device. Optionally, also the information from the digital twin may be provided to the mobile device and presented to the user.

Although various aspects are illustrated above, partly with reference to some preferred embodiments, it must be understood that numerous modifications and combinations of different features of the embodiments can be made. All of these modifications lie within the scope of the appended claims. In particular, the described system may be configured to execute some or all of the described method steps, and the described method may utilize some or all of the described system components.

The invention claimed is:

1. A computer-implemented method for providing information about an individual coordinate measuring device to an owner or a user of the coordinate measuring device, the method comprising:
   providing, in a computational environment, a digital-twin database comprising individual digital twins for a multitude of coordinate measuring devices, each individual digital twin comprising information about the respective individual coordinate measuring device;
   assigning an individual code to each of the multitude of coordinate measuring devices;

providing the individual code of a first coordinate measuring device on the first coordinate measuring device; and pairing the first coordinate measuring device with a mobile device of the owner or user of the first coordinate measuring device, particularly wherein the mobile device is a smartphone or a tablet computer, wherein the pairing comprises:

capturing, by the mobile device, the individual code of the first coordinate measuring device;

establishing a remote data connection between the mobile device and the computational environment;

sending the captured individual code together with an identifier of the mobile device or of a user of the mobile device from the mobile device to the computational environment via the established data connection; and verifying, at the computational environment, the sent individual code and, in case of a positive result of the verification, storing the identifier of the mobile device assigned to the digital twin of the first coordinate measuring device, wherein the method further comprises:

sending a request from the mobile device to the computational environment for information about the first coordinate measuring device together with the identifier of the mobile device; and determining a validity of the request based on the stored identifier and the sent identifier;

wherein, if the request is determined to be valid, the method further comprises:

retrieving the requested information from the individual digital twin of the first coordinate measuring device and sending the requested information to the mobile device; and providing the information about the first coordinate measuring device on a display of the mobile device to the user of the mobile device.

2. The method according to claim 1, wherein the computational environment comprises one or more server computers or a cloud-computing environment of a manufacturer of the first coordinate measuring device, wherein the pairing comprises:

sending owner or user information related to the owner or user of the first coordinate measuring device from the mobile device to the computational environment; and storing the owner or user information in the digital-twin database, assigned to the individual digital twin of the first coordinate measuring device.

3. The method according to claim 1, wherein the information about the individual coordinate measuring devices in the digital-twin database comprises information about individual components of the respective individual coordinate measuring device; and the provided information about the first coordinate measuring device comprises information about individual components of the first coordinate measuring device;

wherein the information about the individual components at least comprises, for each individual component, at least one of:

a lot number, a manufacturer, and a manufacturing date.

4. The method according to claim 1, comprising providing an application software program and installing the application software program on the mobile device, the application software program having program code for capturing the individual code of the first coordinate measuring device;

establishing the data connection between the mobile device and the digital-twin database;

sending the captured individual code to the digital-twin database; and presenting the information about the first coordinate measuring device on a graphical user interface.

5. The method according to claim 1, wherein the individual code is provided as a visible code on a surface of the first coordinate measuring device, and the individual code is captured by an optical sensor of the mobile device.

6. The method according to claim 5, wherein the visible code is a QR code, and the QR code is captured by a camera of the mobile device.

7. The method according to claim 1, wherein the individual code is provided as an NFC tag, and the individual code is captured by means of near-field communication using an NFC module of the mobile device.

8. The method according to claim 1, wherein sending the request comprises capturing, by the mobile device, the individual code of the first coordinate measuring device, and sending the captured individual code together with the request.

9. The method according to claim 1, wherein the data connection between the first coordinate measuring device and the database is established using a cellular phone network and a subscriber identity module of the mobile device.

10. The method according to claim 9, wherein the data connection is established via a SIM card or an embedded SIM of the mobile device.

11. The method according to claim 1, wherein information about the individual coordinate measuring device of each individual digital twin is continuously updated, and retrieving the requested information from the individual digital twin of the first coordinate measuring device comprises retrieving the most recently updated information of the first coordinate measuring device.

12. The method according to claim 1, wherein the first coordinate measuring device is a laser-based metrology device.

13. The method according to claim 12, wherein the laser-based metrology device is a laser tracker, a laser scanner or a total station.

14. The method according to claim 1, wherein the first coordinate measuring device is a coordinate measuring machine (CMM), particularly a portable articulated arm CMM or a stationary CMM.

15. The method according to claim 1, wherein the first coordinate measuring device is a structured-light scanner or photogrammetric system.

16. A computer system for providing information about an individual coordinate measuring device to an owner or user of the individual coordinate measuring device, the system comprising one or more server computers, wherein the one or more server computers comprise memory for storing a digital-twin database, the digital-twin database comprising individual digital twins for a multitude of coordinate measuring devices, each individual digital twin comprising information about the respective individual coordinate measuring device, wherein the computer system is configured:

to receive from the mobile device via a remote data connection an individual code of a first coordinate measuring device together with an identifier of the mobile device or of a user of the mobile device;

to verify the sent individual code and, in case of a positive result of the verification, to store the identifier of the mobile device in the digital-twin database assigned to the digital twin of the first coordinate measuring device;

to receive from the mobile device via the remote data connection a request for information about the first coordinate measuring device together with the identifier of the mobile device;

to determine a validity of the request based on the stored identifier and the received identifier; and to provide, if the request is determined to be valid, the requested information from the individual digital twin of the first coordinate measuring device to the mobile device via the remote data connection.

17. The computer system according to claim 16, wherein an application software program is stored in the memory and the memory is configured to provide the application software program via the remote data connection to the mobile device, wherein the application software program comprises program code that, when the application software program is executed on the mobile device, provides at least a pairing functionality and a request functionality, wherein the pairing functionality comprises capturing, by the mobile device, the individual code of the first coordinate measuring device and sending the captured individual code together with the identifier via the remote data connection; and the request functionality comprises sending the request for information together with the identifier of the mobile device via the remote data connection, receiving the requested information via the remote data connection, and providing the information about the first coordinate measuring device in a graphical user interface on a display of the mobile device.

18. The computer system according to claim 17, wherein the mobile device is a smartphone or a tablet computer, the application software program being installable in a memory of the mobile device, the individual code is provided as a visible code on a surface of the first coordinate measuring device, and the pairing functionality comprises capturing the individual code by an optical sensor of the mobile device.

19. The computer system according to claim 16, wherein the computer system is configured to receive from the mobile device via the remote data connection owner or user information related to the owner or user of the first coordinate measuring device; and to store the owner or user information in the digital-twin database, assigned to the individual digital twin of the first coordinate measuring device.

20. The computer system according to claim 19, wherein the owner or user information is received together with the individual code of the first coordinate measuring device and the identifier.

* * * * *